United States Patent [19]
Alfors

[11] Patent Number: 5,694,039
[45] Date of Patent: Dec. 2, 1997

[54] ANGULAR POSITION SENSOR HAVING MULTIPLE MAGNETIC CIRCUITS

[75] Inventor: Eugene D. Alfors, Rockford, Ill.

[73] Assignee: Honeywell Inc., Minneapolis, Minn.

[21] Appl. No.: 614,792

[22] Filed: Mar. 7, 1996

[51] Int. Cl.$^6$ .............................. G01B 7/30; G01B 7/14
[52] U.S. Cl. ...................... 324/207.2; 324/207.25; 324/207.12
[58] Field of Search ............... 324/207.11–207.26, 324/260, 262, 166, 173, 174, 175

[56] References Cited

U.S. PATENT DOCUMENTS

| | | | |
|---|---|---|---|
| 4,668,465 | 5/1987 | Boomgaard et al. | 376/216 |
| 4,724,710 | 2/1988 | Murty | 73/862.33 |
| 5,059,900 | 10/1991 | Phillips | 324/173 |
| 5,153,512 | 10/1992 | Glasheen | 324/175 |
| 5,164,668 | 11/1992 | Alfors | 324/207.2 |
| 5,211,539 | 5/1993 | McCarty | 324/207.25 |

*Primary Examiner*—Sandra L. O'Shea
*Assistant Examiner*—Jay M. Patidar
*Attorney, Agent, or Firm*—William D. Lanyi; John G. Shudy, Jr.

[57] ABSTRACT

A rotational position sensor, or angular position sensor, that having two pole pieces. Each of the pole pieces has a first end portion and a second end portion. The two second end portions are arranged in overlapping parallel association to provide a gap between them. Two magnetically sensitive components are disposed in the gap between the second end portions of the two pole pieces. The two magnetically sensitive components are used to provide redundancy in the event that one of the magnetically sensitive components experiences a failure.

2 Claims, 5 Drawing Sheets

ANGULAR POSITION SENSOR HAVING MULTIPLE MAGNETIC CIRCUITS

BACKGROUND OF THE INVENTION

1. Field of the Invention

The present invention is generally related to rotational position sensors and, more particularly, to a rotational position sensor that is able to utilize two independent magnetically sensitive components to provide redundancy in the event of the loss of one of the two components.

2. Description of the Prior Art

Many different types of rotational position sensors are well known to those skilled in the art. One specific rotational position sensor is described in U.S. Pat. No. 5,164,668, which issued to Alfors on Nov. 17, 1992. The angular position sensor described in that patent is provided with first and second pole pieces that extend from regions proximate a rotatable permanent magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and third pole piece segments of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive bearing wear.

The device described in U.S. Pat. No. 5,164,668 disposes a single magnetically sensitive device between adjacent portions of the two pole pieces to sense the intensity of the magnetic field passing between the two pole pieces. In recent years, it has become desirable to provide a degree of redundancy in devices such as the angular position sensor of U.S. Pat. No. 5,164,668 and other similar rotational position sensors. In the event that the magnetically sensitive component fails for any reason, it is desirable to have an alternate magnetically sensitive component which provides an alternate signal so that the device is operational even after one of the two magnetically sensitive devices fails. This provision of redundancy is particularly advantageous in automobile applications where a single component failure can disable the automobile. If redundant components, such as the magnetically sensitive device, are provided, the failure of a single component will not disable the automobile.

U.S. Pat. No. 5,164,668 is hereby explicitly incorporated by reference in this description.

SUMMARY OF THE INVENTION

A preferred embodiment of the present invention comprises a permanent magnet which is attachable to a rotatable shaft. The rotatable magnet is preferably attachable to a shaft, such as the rotational shaft of an automobile engine throttle or the pivot shaft of an accelerator pedal of an automobile. The present invention is capable of attachment to any shaft for the purpose of monitoring its angular position relative to a centerline. The present invention further comprises a first ferromagnetic pole piece having a first end portion and a second end portion. It also comprises a second ferromagnetic pole piece having a first end portion and a second end portion. The permanent magnet is disposed between the first end portion of the first ferromagnetic pole piece and the first end portion of the second ferromagnetic pole piece. The second end portion of the first ferromagnetic pole piece is disposed in parallel overlapping association with the second end portion of the second ferromagnetic pole piece. A first magnetically sensitive component is disposed between the second end portion of the second ferromagnetic pole piece and the second end portion of the first ferromagnetic pole piece. In addition, a second magnetically sensitive component is disposed between the second end portion of the second ferromagnetic pole piece and the second end portion of the first ferromagnetic pole piece. In other words, both the first and second magnetically sensitive components are disposed between the parallel and overlapping second end portions of the two pole pieces. This allows the magnetic flux emanating from the permanent magnet to pass through the two magnetically sensitive components along parallel magnetic paths and be independently sensed by both magnetically sensitive components. This provides a redundancy in the event that one of the two magnetically sensitive components fails.

In a particularly preferred embodiment of the present invention, it further comprises first and second protrusions formed on the second end portion of the first ferromagnetic pole piece and extending toward the second end portion of the second ferromagnetic pole piece. In a particularly preferred embodiment of the present invention, it further comprises first and second protrusions formed on the second end of the second ferromagnetic pole piece and extending toward the second end portion of the first ferromagnetic pole piece. The first and second protrusions of the second ferromagnetic pole piece extend toward the first and second protrusions of the first ferromagnetic pole piece, respectively, and the first and second magnetically sensitive components are disposed between the associated protrusion pairs of the two pole pieces.

In a particularly preferred embodiment of the present invention, the first and second magnetically sensitive components are Hall effect elements but, in alternative embodiments, the magnetically sensitive components can comprise magnetoresistors. The first and second magnetically sensitive components each provide separate output signals which are representative of the magnetic flux emanating from the permanent magnet and passing through the first and second ferromagnetic pole pieces.

Although the present invention is not limited by the type of control system provided for an automobile or similar structure which utilizes the rotational position sensor of the present invention, it should be understood by one skilled in the art that the output signals provided by the first and second magnetically sensitive components can easily be used in a redundant manner. For example, in a simple form of this type of application, each of the two signals can be interrogated to determine whether they exceed a minimum threshold value and are also less than a maximum threshold value. If both of these conditions are met, the two output signals can be averaged by a microprocessor or, alternatively, a preferred one of the two magnetically sensitive components can be used as a primary source of the signal unless it fails to achieve both threshold conditions. Under that type of failure mode, the other magnetically sensitive component could be used to provide the output signal. Many different schemes can be employed to take advantage of the redundancy provided by the present invention.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 3:
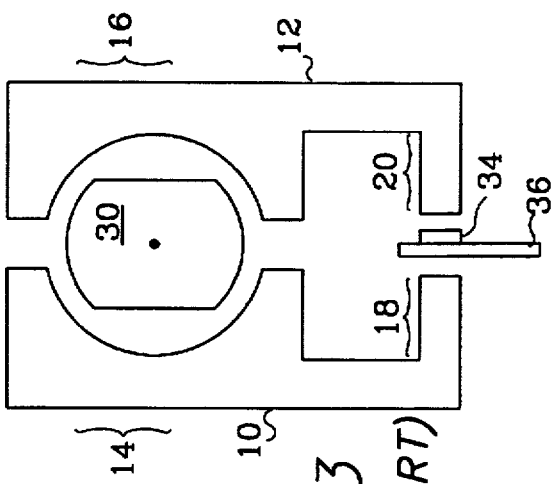
FIGS. 1, 2, 3 and 4 illustrate angular position sensors known to those skilled in the art and described in U.S. Pat. No. 5,164,668.

Throughout the Description of the Preferred Embodiment, like components will be identified by like reference numerals.

Figure 1:
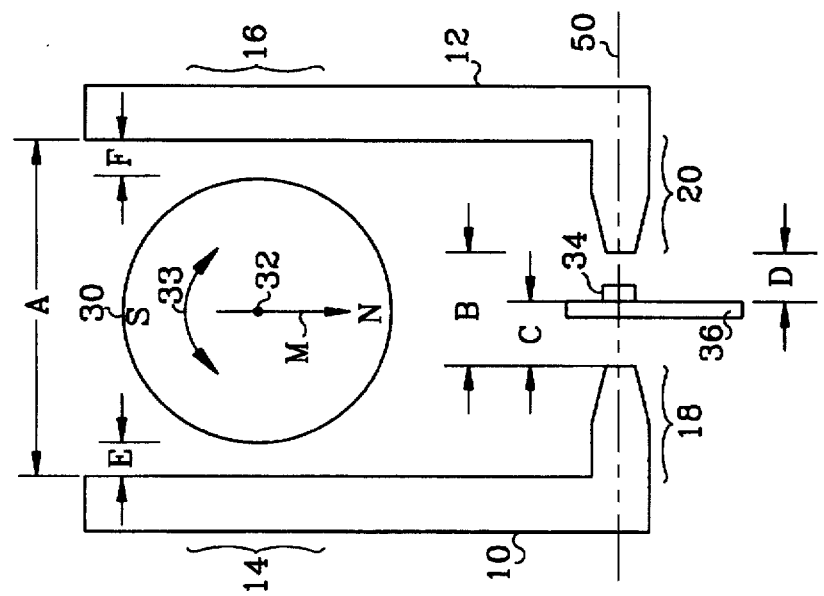

FIGS. 1, 2, 3 and 4 illustrate various prior art configurations that are specifically described in U.S. Pat. No. 5,164,668. FIG. 1 shows a first ferromagnetic pole piece 10 and a second ferromagnetic pole piece 12 which each have first end portions, 14 and 16, respectively. They also each have second end portions, 18 and 20, respectively. A permanent magnet 30 is rotatable about a central point 32 in either of the two directions represented by arrow 33. In FIG. 1, the permanent magnet is generally circular and exhibits gaps, E and F, between it and the first end portions of the two pole pieces. Between the second end portions, 18 and 20, a magnetically sensitive component 34 is attached to a printed circuit board 36. The purpose of dimensions B, C and D in FIG. 1 is to show the relative distances between the opposing pole faces of the second end portions, 18 and 20, and the position of the magnetically sensitive component 34. This configuration is more specifically discussed in U.S. Pat. No. 5,164,668. Although FIG. 1 shows the two second end portions, 18 and 20, facing each other while being aligned along a common axis 50, it should be understood that the second end portions, 18 and 20, could be arranged in overlapping association with each other with the magnetically sensitive component 34 being disposed between the overlap.

Figure 2:
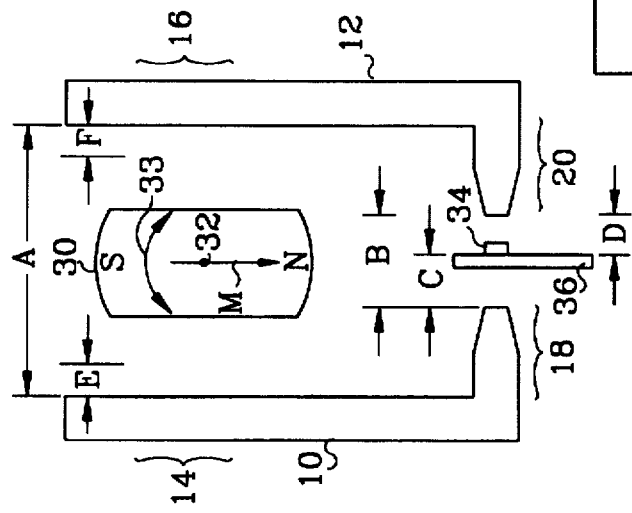

FIG. 2 is an alternative embodiment of the device described in U.S. Pat. No. 5,164,668 wherein a noncircular magnet 30 is used. The other dimensions shown in FIG. 2 are similar to those discussed above in conjunction with FIG. 1. In addition, the device shown in FIG. 2 is described in detail in U.S. Pat. No. 5,164,668.

The embodiment shown in FIG. 3 is also well known to those skilled in the art. The first end portions, 14 and 16, of the first and second ferromagnetic pole pieces, 10 and 12, are specifically shaped to more fully enclose the path of the rotatable magnet 30. In certain embodiments of the device, it may be beneficial to more completely enclose the magnetic flux emanating from the permanent magnet 30.

Figure 4:
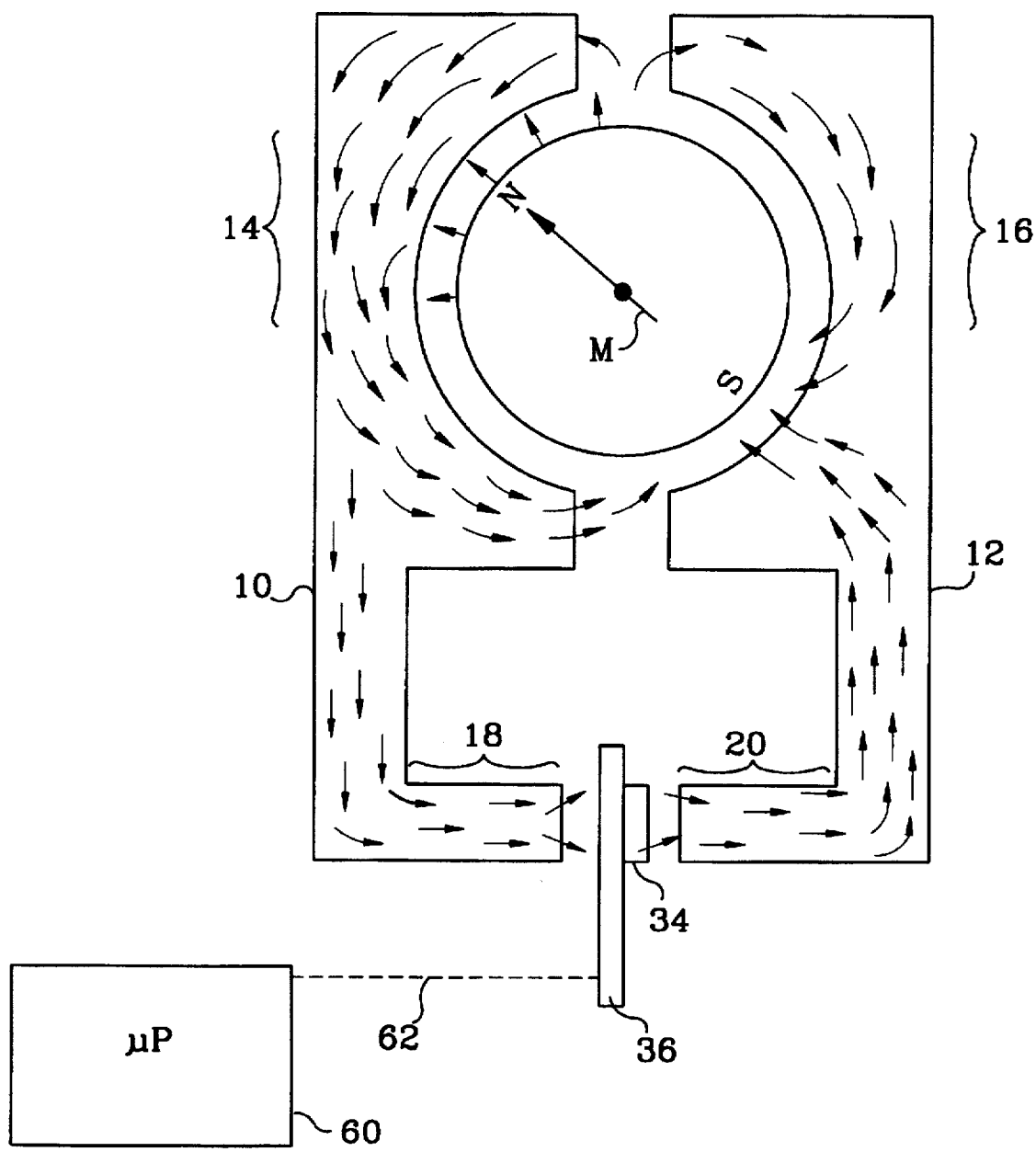

FIG. 4 illustrates the configuration of FIG. 3 with the lines of magnetic flux illustrated for one particular position of the rotatable magnet 30. In addition, a microprocessor 60 is shown connected, by dashed line 62, to the printed circuit board 36 to represent a signal communication between the magnetically sensitive component 34 and the microprocessor 60. An output signal from the magnetically sensitive component 34 is transmitted to the microprocessor and is representative of the intensity of magnetic flux passing perpendicularly through the plane of the magnetically sensitive component 34 if the component is a Hall effect element.

With respect to FIGS. 1, 2, 3 and 4, each of the devices is illustrated as having a single magnetically sensitive component 34 disposed between the second end portions of the ferromagnetic pole pieces. In certain instances, it may be beneficial to provide two magnetically sensitive components that sense the same magnitude of magnetic flux and provide independent output signals that represent the intensity of that magnetic flux. In the event that one of the two magnetically sensitive components experiences a failure, the output signal from the other magnetically sensitive component can be used and the related equipment will not be completely disabled because of the failure.

Figure 5:
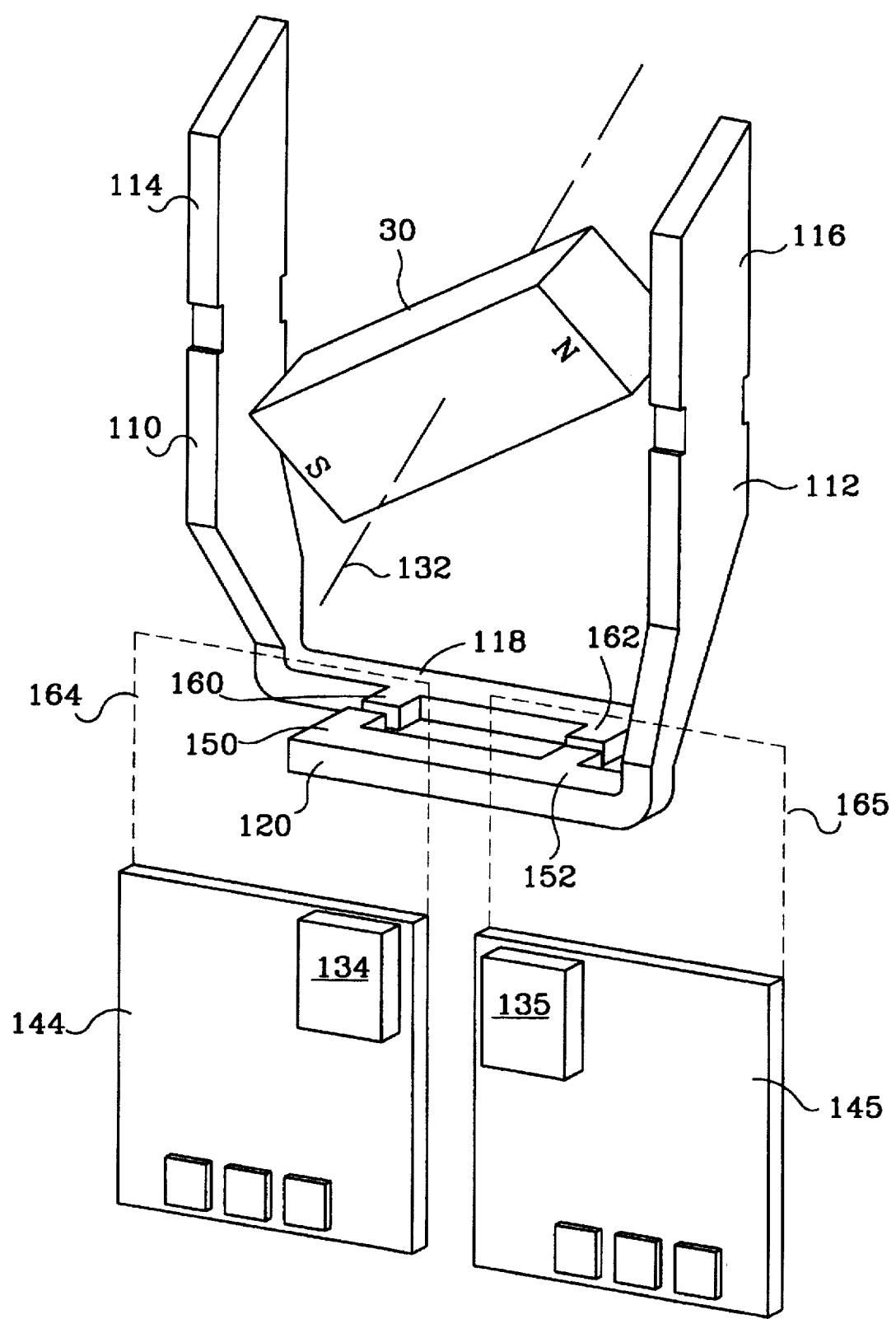
FIG. 5 shows an exploded perspective view of the present invention.

FIG. 5 illustrates a preferred embodiment of the present invention. A first ferromagnetic pole piece 110 has a first end portion 114 and a second end portion 118. A second ferromagnetic pole piece 112 has a first end portion 116 and a second end portion 120. The first end portions of both pole pieces are arranged with a permanent magnet 30 disposed between them and rotatable about a central axis 132. The second end portions of both ferromagnetic pole pieces are arranged in parallel overlapping association. The second end portion 118 of the first pole piece 110 has two protrusions extending from it. A first protrusion 160 and a second protrusion 162 extend away from the second end piece 118 of the first ferromagnetic pole piece 110 and toward the second end piece 120 of the second ferromagnetic pole piece 112. In one embodiment of the present invention, the second end piece 120 of the second ferromagnetic pole piece 112 also has a first protrusion 150 and a second protrusion 152. The first and second protrusions of the two pole pieces are arranged proximate each other with a space therebetween. In the space between the protrusions, first and second magnetically sensitive components are disposed. For example, magnetically sensitive component 134 is disposed between protrusions 150 and 160. Magnetically sensitive component 135 is disposed between protrusions 152 and 162. The first and second magnetically sensitive components, 134 and 135, are attached to printed circuit boards, 144 and 145, respectively. For purposes of clarity and to facilitate the illustration of the various components in FIG. 5, the printed circuit boards are shown moved from their operational position. To show where the printed circuit boards would normally be disposed, dashed lines 164 and 165 represent the operational positions of the two printed circuit boards. The microprocessor 60 can be connected to both printed circuit boards, such as by dashed line 62, as illustrated in FIG. 4.

With continued reference to FIG. 5, the arrangement of protrusions provides two parallel magnetic paths to conduct the magnetic flux emanating from the rotatable permanent magnet 30. Each of the two magnetically sensitive components, 134 and 135, will experience approximately the same intensity of magnetic field passing perpendicularly through its sensing plane. It should be understood that other components would typically be included on the printed circuit boards, but these components do not relate directly to the present invention and are therefore not shown in FIG. 5. The three boxes on each printed circuit board represent contact pads that permit external components to be attached in electrical communication with the magnetically sensitive components and there related electronic devices on the printed circuit boards.

Figure 6:
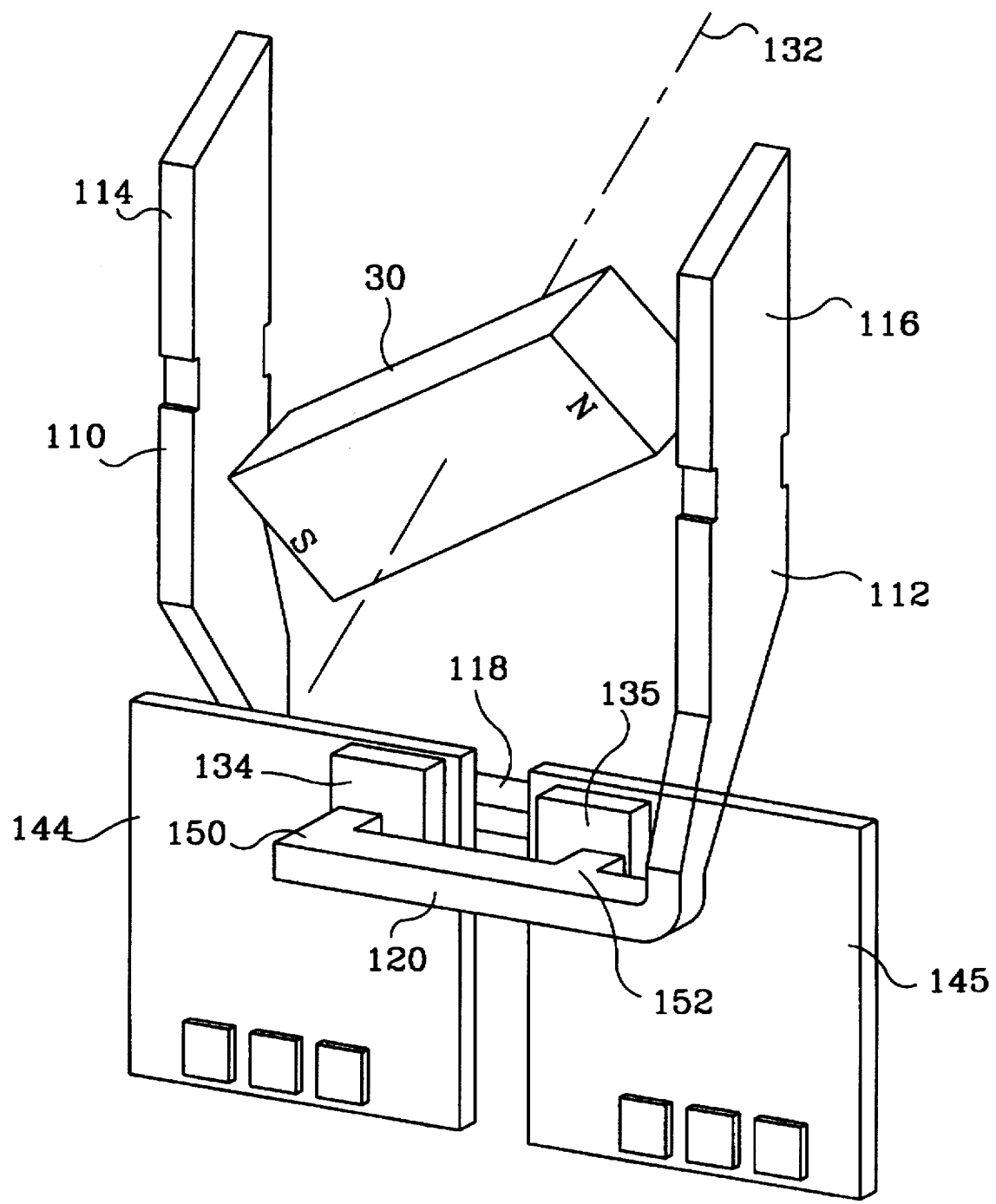
FIG. 6 shows the device in FIG. 5 with the magnetically sensitive components disposed between their respective protrusions.

FIG. 6 shows the arrangement of FIG. 5 with the two printed circuit boards, 144 and 145, disposed in their operational positions with the two magnetically sensitive components, 134 and 135, disposed between the protrusions of the second end portions of both pole pieces. In the configuration shown in FIG. 6, each of the two magnetically sensitive components will receive approximately equal shares of the flux emanating from the rotatable permanent magnet 30. If either of the two magnetically sensitive components fails during operation, the other magnetically sensitive component will provide a redundant source of a signal representing the strength of the magnetic flux provided by the permanent magnet 30.

Figure 7:
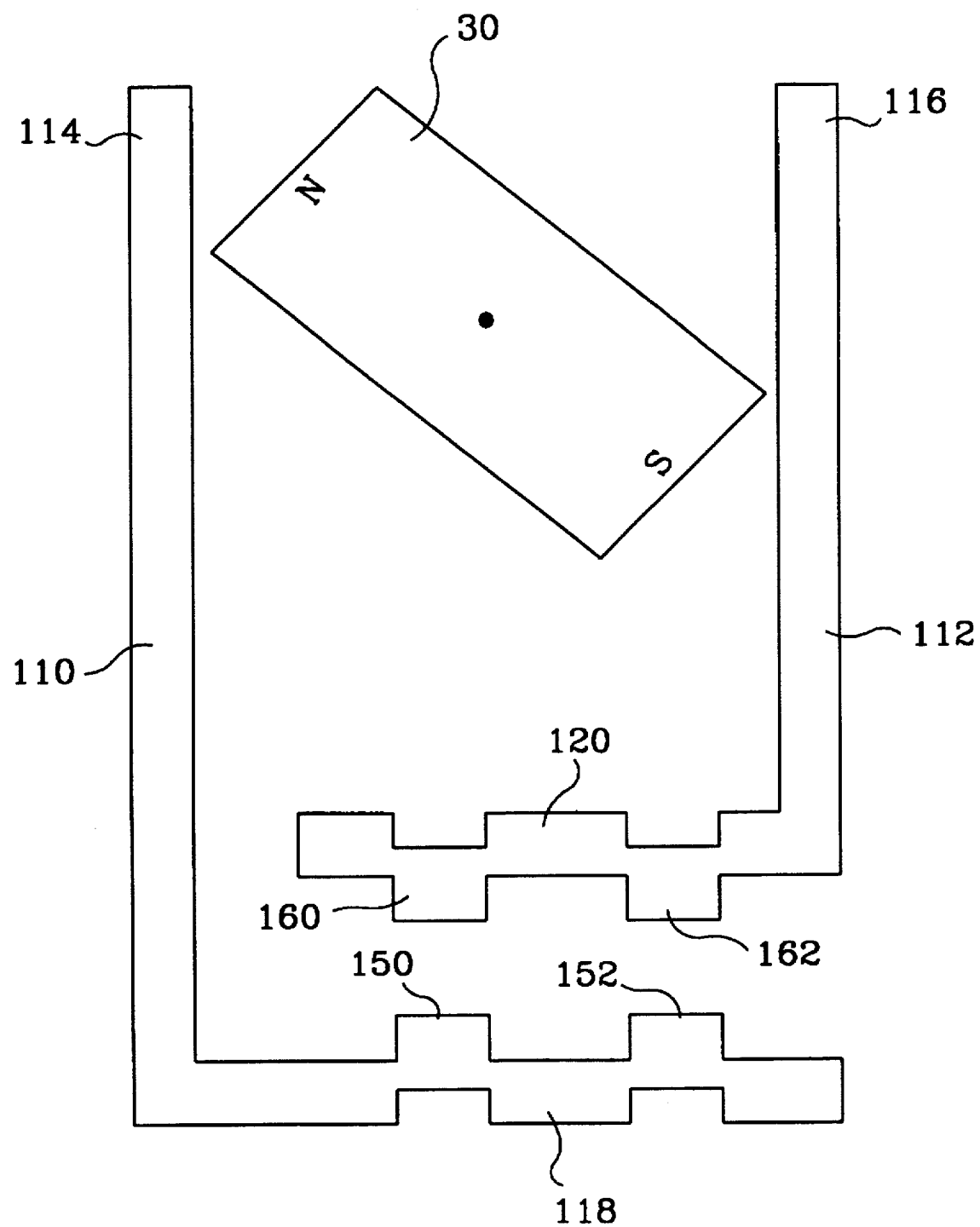
FIG. 7 shows an alternative embodiment of the present invention.

FIGS. 7 shows an alternative embodiment of the present invention. The protrusions, 150, 152, 160 and 162, are formed by upsetting the material of the second end portions, 118 and 120, of the two pole pieces. By mechanically distorting the shape of the second end portions, 118 and 120, by the upset process, the protrusions are formed and provide a preferred magnetic path for the flux emanating from the permanent magnet 30. Comparing FIGS. 5 and 7, it can be seen that the protrusion of the second end portions can be formed by adding additional material, as in FIG. 5, or by upsetting the shape of the second end portions, as in FIG. 7. Either method provides preferred parallel magnetic paths for the flux to extend through and, as a result, the majority of the flux emanating from the permanent magnet 30 will pass through the two magnetically sensitive components disposed between the protrusions.

Several embodiments of the present invention have been described and illustrated to show the characteristics of the present invention. The protrusions are not required in all embodiments of the present invention. Instead, generally flat bars can serve as the second end portions of the pole pieces if they are placed in parallel overlapping association with each other. A preferred embodiment of the present invention improves the concentration of flux through two preferred parallel paths by disposing protrusions on the second end portions. The purpose of the protrusions is to create parallel paths of lesser reluctance than the remaining paths through the two second end portions. In addition, it should be understood that alternative embodiments of the present invention can provide protrusions on only one of the second end portions while the other second end portion is in the shape of a flat bar with no protrusions. Although less preferred than the embodiments shown in FIGS. 5, 6 and 7, protrusions on one of the second end portions will improve the flux density passing through the magnetically sensitive components compared to the use of two flat bars for the second end portions of the pole pieces.

The embodiments of the invention in which an exclusive property or right is claimed are defined as follows:

1. An angular position sensor, comprising:

a permanent magnet which is attachable to a rotatable shaft;

a first ferromagnetic pole piece having a first end portion and a second end portion;

a second ferromagnetic pole piece having a first end portion and a second end portion, said permanent magnet being disposed between said first end portion of said first ferromagnetic pole piece and said first end portion of said second ferromagnetic pole piece, said second end portion of said first ferromagnetic pole piece being disposed in parallel overlapping association with said second end portion of said second ferromagnetic pole piece;

a first magnetically sensitive component disposed between said second end portion of said second ferromagnetic pole piece and said second end portion of said first ferromagnetic pole piece;

a second magnetically sensitive component disposed between said second end portion of said second ferromagnetic pole piece and said second end portion of said first ferromagnetic pole piece;

first and second protrusions formed on said second end portion of said first ferromagnetic pole piece and extending toward said second end portion of said second ferromagnetic pole piece with said first and second magnetically sensitive components disposed between second end portion of said second ferromagnetic pole piece and said first and second protrusion, respectively; and first and second protrusion formed on said second end of said second ferromagnetic pole piece and extending toward said second end portion of said first ferromagnetic pole piece, said first protrusion of said second end portion of said second ferromagnetic pole piece extending toward said first protrusion of said second end portion of said first ferromagnetic pole piece, said second protrusion of said second end portion of said second ferromagnetic pole piece extending toward said second protrusion of said second end portion of said first ferromagnetic pole piece; and wherein said first and second magnetically sensitive components each provide separate output signals which are representative of the intensity of magnetic flux emanating from said permanent magnet through said first and second ferromagnetic pole pieces, and the output signals are each representative of the angular position of said permanent magnet.

2. The sensor of claim 1, wherein:

said first and second magnetically sensitive components are Hall effect elements.

* * * * *